US007480305B1

(12) United States Patent
Somasundaram

(10) Patent No.: US 7,480,305 B1
(45) Date of Patent: Jan. 20, 2009

(54) APPARATUS AND METHODS FOR MAINTAINING THE REGISTRATION STATE OF AN IP DEVICE IN A NETWORK ADDRESS PORT TRANSLATION (NAPT) ENVIRONMENT

(75) Inventor: Mahadev Somasundaram, Santa Clara, CA (US)

(73) Assignee: Cisco Technology, Inc., San Jose, CA (US)

( * ) Notice: Subject to any disclaimer, the term of this patent is extended or adjusted under 35 U.S.C. 154(b) by 1042 days.

(21) Appl. No.: 10/078,851

(22) Filed: Feb. 19, 2002

(51) Int. Cl.
*H04L 12/28* (2006.01)

(52) U.S. Cl. .................. 370/401; 370/392; 370/400; 370/466

(58) Field of Classification Search ................ 370/352, 370/392, 400–402, 466, 467, 469; 375/211
See application file for complete search history.

(56) References Cited

U.S. PATENT DOCUMENTS

| | | | | |
|---|---|---|---|---|
| 5,835,710 | A * | 11/1998 | Nagami et al. ............. | 709/250 |
| 6,119,171 | A * | 9/2000 | Alkhatib .................... | 709/245 |
| 6,266,707 | B1 * | 7/2001 | Boden et al. ............... | 709/245 |
| 6,324,279 | B1 * | 11/2001 | Kalmanek et al. .......... | 379/229 |
| 6,654,792 | B1 * | 11/2003 | Verma et al. ............... | 709/208 |
| 6,886,103 | B1 * | 4/2005 | Brustoloni et al. .......... | 726/15 |
| 6,957,276 | B1 * | 10/2005 | Bahl .......................... | 709/245 |
| 6,963,982 | B1 * | 11/2005 | Brustoloni et al. .......... | 713/160 |
| 7,085,860 | B2 * | 8/2006 | Dugan et al. ............... | 710/36 |
| 7,136,645 | B2 * | 11/2006 | Hanson et al. .............. | 709/225 |
| 2001/0050918 | A1 * | 12/2001 | Suprenant et al. .......... | 370/442 |
| 2002/0085561 | A1 * | 7/2002 | Choi et al. ................... | 370/392 |

OTHER PUBLICATIONS

Tsirtsis & Srisuresh, Network Working Group, RFC 2766, "Network Address Translation—Protocol Translation (HAT-PT)", Copyright © The Internet Society (2000).
Rosenberg et al., Network Working Group, RFC 3261, "SIP: Session Initiation Protocol", Copyright © The Internet Society (1999).

* cited by examiner

*Primary Examiner*—Chi H Pham
*Assistant Examiner*—Donald L Mills
(74) *Attorney, Agent, or Firm*—Weaver Austin Villeneuve & Sam son LLP

(57) ABSTRACT

Disclosed are methods and apparatus for managing a registration state of an endpoint node in a network address port translation environment. A registration message is received from a first endpoint node located within a local network. The registration message is sent from the first endpoint node to a gatekeeper node, and the registration message includes a local source address of the first endpoint node, a local source port of the first endpoint node, and local call signaling information to be used by another endpoint node to initiate a data connection with the first endpoint node. The local source address of the first endpoint node is translated into a first global address. A first binding that associates the local source address with the global source address is created. The local call signaling information is translated into global call signaling information. A registration state of the first endpoint node is maintained, and the first binding is maintained based on the registration state (e.g., by using "registration doors").

36 Claims, 8 Drawing Sheets

US 7,480,305 B1

APPARATUS AND METHODS FOR MAINTAINING THE REGISTRATION STATE OF AN IP DEVICE IN A NETWORK ADDRESS PORT TRANSLATION (NAPT) ENVIRONMENT

BACKGROUND OF THE INVENTION

The present invention relates to methods and apparatus for processing data within a computer network. More specifically, this invention relates to mechanisms for performing network address translation on data.

For a particular computer to communicate with other computers or web servers within a network (e.g., the Internet), the particular computer must have a unique IP address. IP protocol version 4 specifies 32 bits for the IP address, which theoretically gives about 4,294,967,296 unique IP addresses. However, there are actually only between 3.2 and 3.3 billion available IP addresses since the addresses are separated into classes and set aside for multicasting, testing and other special uses. With the explosion of the Internet, the number of IP address is not enough to give each computer a unique IP address.

One solution for addressing computers with the limited number of IP addresses is referred to as network address translation (NAT). NAT allows an intermediary device (e.g., computer, router or switch) located between the Internet network and a local network to serve as an agent for a group of local computers. A small range of IP addresses or a single IP address is assigned to represent the group of local computers. Each computer within the local group is also given a local IP address that is only used within that local group. However, the group's local IP addresses may be a duplicate of an IP address that is used within another local network. When a local computer attempts to communicate with a computer outside the local network, the intermediary device matches the local computer's local IP address to one of the intermediary device's assigned IP addresses. The intermediary device than replaces the local computer's local address with the matched assigned IP address. This matched assigned IP address is then used to communicate between the local computer and the outside computer. Thus, NAT techniques allow IP address to be duplicated across local networks.

With the advent of voice over IP (VoIP) technology and integration of voice, video traffic, and data, several user applications were developed in conformance with recommended standards, such as H.323 or SIP (Session Initiation Protocol). These protocols require embedded addresses and ports in their control path, which are later used to establish data communication between two endpoint devices. In a typical implementation, two endpoints that wish to communicate with each other will first each register their identity with a "Gatekeeper" server which has their corresponding phone numbers and port and address information. After registration of a particular endpoint, another endpoint may obtain the registered endpoint's address and port information from the Gatekeeper server using the registered endpoint's phone number. The initiating endpoint may then establish a call to the registered endpoint with the obtained address and port information. Typically, an endpoint's registration may time out at the gatekeeper server if the registered endpoint does not send "keep alive" messages to the Gatekeeper Server before a predefined time-to-live timer has expired.

When registration messages pass through a network address translation device, a binding may be created between an endpoint's local address and port and a global address and port. However, after such endpoint times out or unregisters with the Gatekeeper Server, this binding will no longer be used since a caller can no longer obtain address and port information from the Gatekeeper Server regarding the unregistered endpoint. Accordingly, the global address and port used within the binding cannot be reused by another registered endpoint (or any other type of device). This "wasted" global address and port may not be a problem in NAT devices which have a significant number of pool addresses for use in translation. However, an unused global address and port may be significant for NAT devices which use only a single global address or a small number of global address for translation.

Accordingly, there is a need for NAT mechanisms that are capable of releasing bindings between global addresses and/or ports and their corresponding local addresses and ports when an endpoint is no longer registered. More generally, there is a need for mechanisms for maintaining registration states of endpoint nodes within a network address port translation environment.

SUMMARY OF THE INVENTION

Accordingly, the present invention provides methods and apparatus for maintaining registration states of individual nodes (e.g., endpoint devices) in a network address port translation (NAPT) environment. In general terms, when a node sends a registration message for facilitating a data connection between such node and another node through a network address/port translation (NAT) device, the NAT device performs two general operations. First, the NAT device translates any local addresses and ports associated with the registering node into global addresses and ports and the NAT device remembers which local addresses and ports are matched with which global addresses and ports.

The NAT device also maintains the registered node's registration state and uses the node's current state to determine whether to relinquish resources that were previously being used for the now unregistered node. For example, a registration data structure may be associated with the newly created binding for the registered node to indicate that the node is currently registered and a binding between the global and local address and port required for establishing a data connections with such registered node. When the registered node sends an unregister message for inhibiting communication between such node and another node through the NAT device, the NAT device dismantles the registration data structure and its associated binding that was previously created for the registered node. In another example, when the registered node's registration times out (e.g., based on a predefined time-to-live value), the registration data structure indicates that a time out has occurred and, in response, the NAT device dismantles the timed-out node's associated binding, as well as the associated registration data structure. Otherwise, the NAT device keeps the binding intact.

In one embodiment, a method for managing a registration state of an endpoint node in a network address port translation environment. A registration message is received from a first endpoint node located within a local network. The registration message is sent from the first endpoint node to a gatekeeper node, and the registration message includes a local source address of the first endpoint node, a local source port of the first endpoint node, and local call signaling information to be used by another endpoint node to initiate a data connection with the first endpoint node. The local source address of the first endpoint node is translated into a first global address. A first binding that associates the local source address with the global source address is created. The local call signaling information is translated into global call signaling information. A registration state of the first endpoint node is maintained, and the first binding is maintained based on the registration state.

In one implementation, the call signaling information includes the local media address and a local media port that are to be used after they are translated into the first global address and a first global port by another endpoint node to communicate with the first endpoint node. Additionally, the local call signaling information is translated by translating the local media address into the first global address and translating the media port into the first global port.

In a further aspect, maintaining the registration state is accomplished by (1) setting a timer based on a time period associated with the registration message, (2) restarting the timer when a refresh message is received from the first endpoint node, and (3) dismantling the first binding when the timer expires or an unregistration message is received from the first endpoint node. In yet a further aspect, maintaining the registration state is further accomplished by (4) creating a registration door containing the global call signaling information and the time period after which the registration of the first endpoint node is to expire, the time period originating from within the local call signaling information and (5) dismantling the registration door when the timer expires or an unregistration message is received from the first endpoint node. In one embodiment, the first binding is an entry within a NAT Table and the registration door is an entry within a Registration Table.

In another embodiment, maintaining the registration state is accomplished by (1) creating a registration door containing the global call signaling information and a time period after which the registration of the first endpoint node is to expire, where the time period originating from within the local call signaling information and (2) associating the registration door with the first binding. Associating the registration door with the first binding is accomplished by forming a link there between. In a further aspect, a communication message is received from a second endpoint node destined for the first endpoint node. The communication message is a first message to establish a data connection between the second and first endpoint. The communication message has a second source address, a second destination address, a second source port, and a second destination port. Additionally, the second destination address equals the first global address and the second destination port equals a first global port obtained from the global call signaling information. The communication message is translated based on the registration door. Also, a second binding is created based on the registration door. The second binding is useful for translating subsequent communication messages sent between the first and second endpoints. In yet a further aspect, the registration door and its associated first binding are dismantled when a timer associated with the registration message expires or an unregistration message is received from the first endpoint node.

In another embodiment, a second registration message is received from a second endpoint node located within a local network. The second registration message is sent from the second endpoint node to a gatekeeper node. The registration message includes a second local source address, a second local source port, and second local call signaling information to be used by another endpoint node to initiate a data connection with the second endpoint node. The second local source address is translated into the first global source address. A second binding that associates the second local source address with the first global source address is created. The second local call signaling information is translated into a second global call signaling information. A second registration state of the second endpoint node is maintained, and the second binding is maintained based on the registration state.

In another embodiment, the invention pertains to a network address translation (NAT) system operable to manage a registration state of an endpoint node in a network address port translation environment. The NAT system includes one or more processors and one or more memory. At least one of the memory and processors are adapted to provide at least some of the above described method operations. In yet a further embodiment, the invention pertains to a computer program product for managing a registration state of an endpoint node in a network address port translation environment. The computer program product has at least one computer readable medium and computer program instructions stored within at least one of the computer readable product configured to perform at least some of the above described method operations.

These and other features and advantages of the present invention will be presented in more detail in the following specification of the invention and the accompanying figures which illustrate by way of example the principles of the invention.

DETAILED DESCRIPTION OF SPECIFIC EMBODIMENTS

Reference will now be made in detail to a specific embodiment of the invention. An example of this embodiment is illustrated in the accompanying drawings. While the invention will be described in conjunction with this specific embodiment, it will be understood that it is not intended to limit the invention to one embodiment. On the contrary, it is intended to cover alternatives, modifications, and equivalents as may be included within the spirit and scope of the invention as defined by the appended claims. In the following description, numerous specific details are set forth in order to provide a thorough understanding of the present invention. The present invention may be practiced without some or all of these specific details. In other instances, well known process operations have not been described in detail in order not to unnecessarily obscure the present invention.

Figure 1:
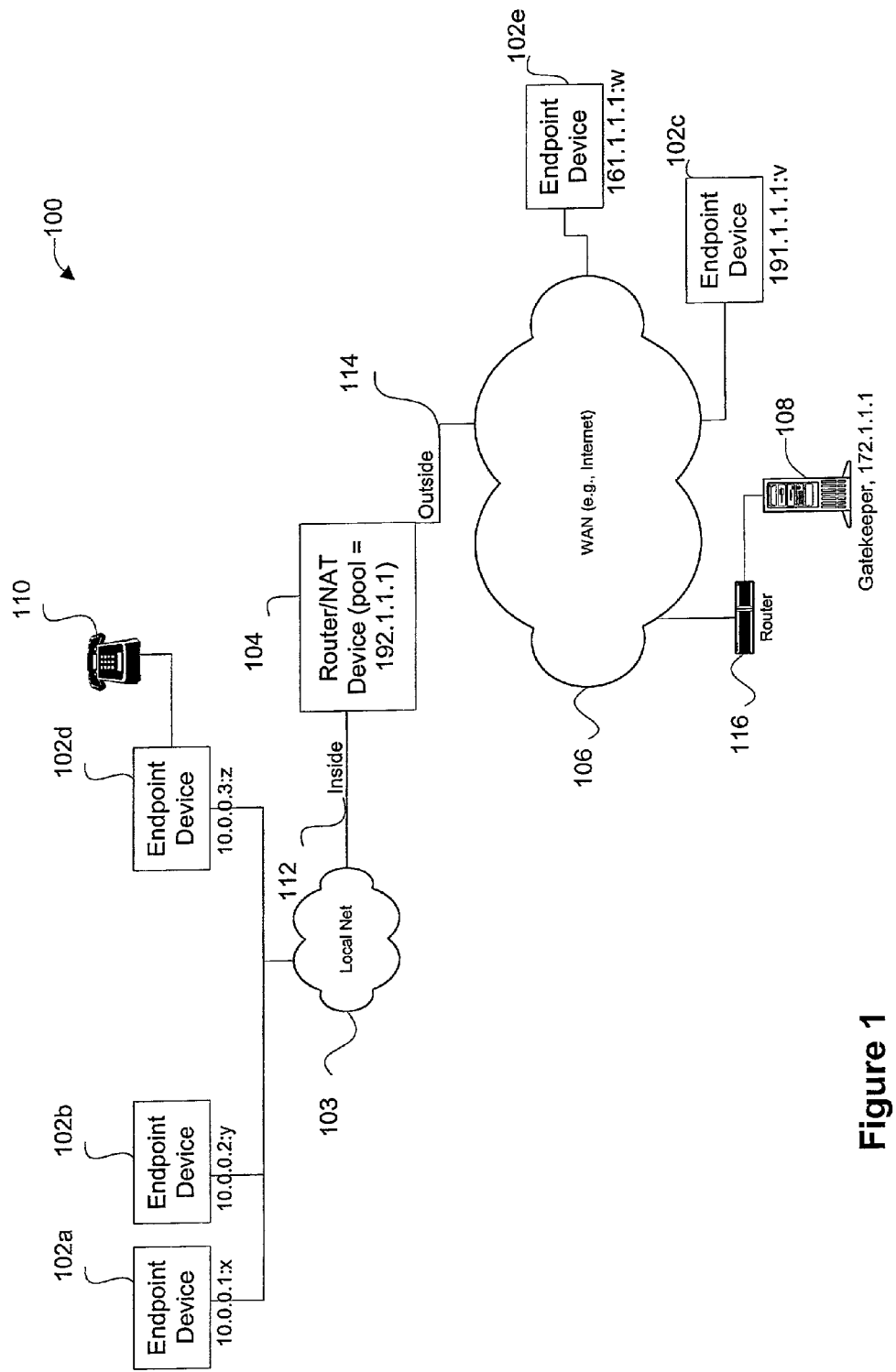
FIG. 1 is a diagrammatic illustration of portions of a network in which the techniques of the present invention may be implemented in accordance with one embodiment of the present invention.

FIG. 1 is a diagrammatic illustration of portions of a network 100 in which the techniques of the present invention may be implemented in accordance with one embodiment of the present invention. In general terms, the present invention provides mechanisms for performing network address and port translation (NAPT or sometimes referred to as NAT) for a plurality of nodes while maintaining registration states of one or more of these nodes. A registration state generally indicates a corresponding node's ability to participate in a data connection between such node and another registered node. For example, a data connection may be initiated with a registered node, but not an unregistered node. A data connection may include communication of any form of data, such as video, voice, text, or images. Additionally, a node's registration status may time out and expire, whereby such node becomes unregistered. In the illustrated embodiment, these NAT techniques are implemented within a combination router and NAT device 104. Of course the NAT techniques of the present invention may be implemented in any suitable number and type of devices. For example, one device may perform routing operations, while another device performs network address/port operations.

In the illustrated example, the NAT device 104 has an inside interface 112 and an outside interface 114. The inside interface 112 is coupled with local network 103, while the outside interface 114 is coupled with public or wide area network (WAN) 106, e.g., the Internet. The terms "local" and "private" are used herein interchangeably, while the terms "global" and "public" are used interchangeably. As described above, a local network uses addresses and ports that are unique only within the particular local network, and these local addresses and ports are not known to others that are located outside the particular local network. In contrast, a public network uses addresses and ports which are unique among all public networks and are known or knowable by other public networks, as well as other local networks.

Each network 103 and 106 may include other server or client platforms (not shown). Local network 103 includes endpoint devices 102a, 102b, and 103d. WAN 106 includes server 108, which may be accessed through router 116, and endpoint devices 102c and 102e. Any number of routers and/or NAT devices may be distributed throughout network 100. For example, each network may be associated with its own router/NAT device. Each endpoint device may include a "soft" communication application, such as a telephone application, on a personal computer or other type of processing device. Alternatively, an endpoint device may be in the form of a gateway device (e.g., 102d) coupled with a conventional hardware communication device, such as a telephone (e.g., 110).

In general terms, the present invention provides mechanisms for tracking an endpoint's registration status with respect to a server, such as the gatekeeper server or node 108. The terms "gatekeeper server" or "gatekeeper node" refer to any type of call management server, such as a gatekeeper server for an H.323 application or a registration proxy for an SIP application. The current registration states are used to reserve or relinquish resources used by address and/or port translation processes (e.g., within NAT device 104). Although the techniques of the present invention are described as being implemented with VoIP endpoint devices, other types of devices which establish a data connection by some form of registration process are also contemplated.

Several typical operations that may be performed during a traditional NAT are omitted so as to not obscure the invention with unnecessary details which are well known to those skilled in the art. For instance, the present invention may include mechanisms for logging an error if a private address has no defined binding and there are no more available public addresses in the NAT device's pool for translation. Additionally, mechanisms may be included for handling TCP packets. Several typical procedures that may be performed on data along with translating the data and/or sending it to its destination are described further in U.S. patent having U.S. Pat. No. 5,793,763 by Mayes et al., issued Aug. 11, 1998 and U.S. patent application having application Ser. No. 10/026,272 by Somasundaram, Mahadev et al, filed Dec. 21, 2001, which patent and application are incorporated herein in its entirety.

Figure 2:
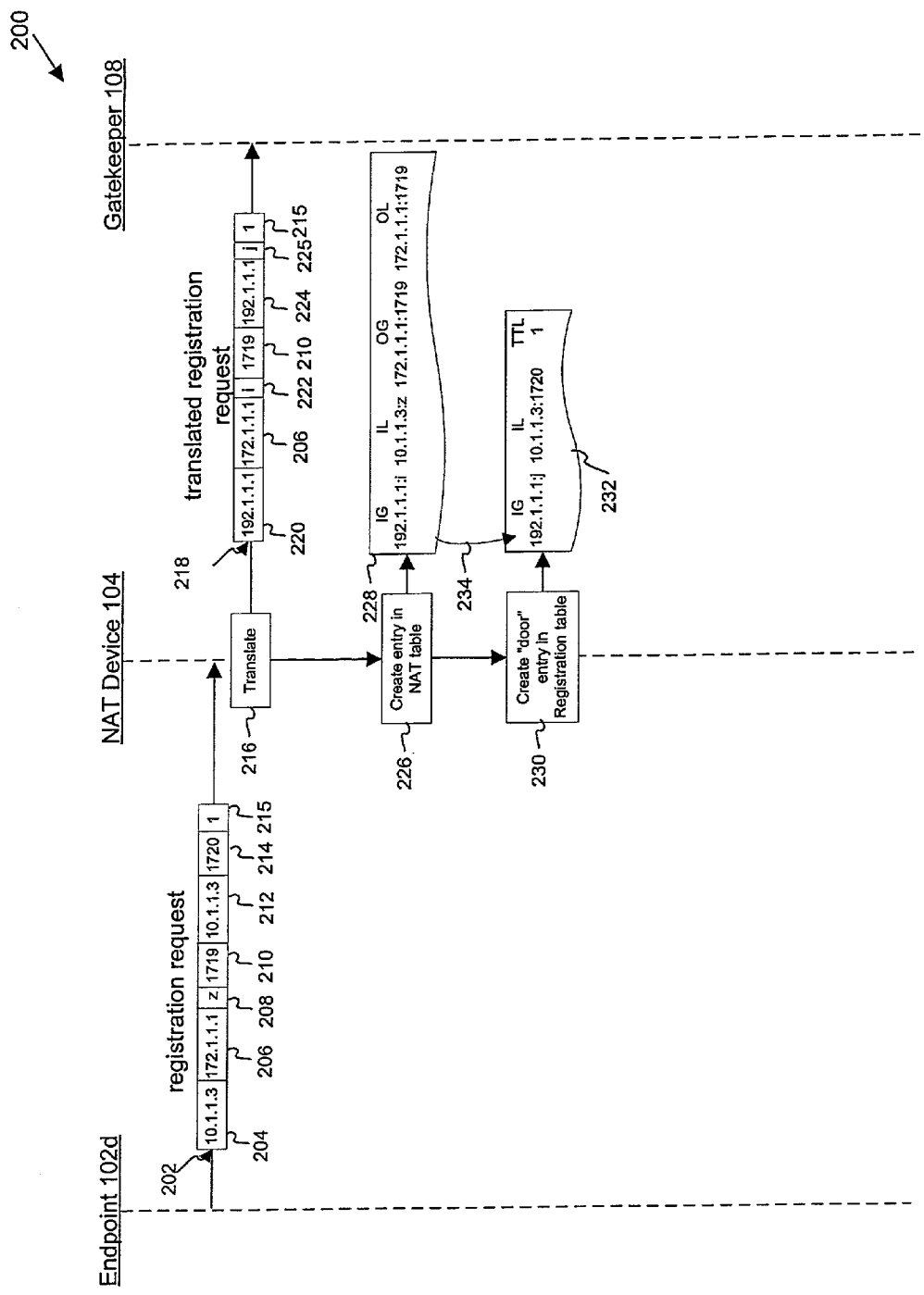
FIG. 2 illustrates a translation procedure for a registration request sent from a first endpoint within a local network to a gatekeeper through a NAT device in accordance with one embodiment of the present invention.

An endpoint node or other type of node may have its registration state maintained and use these maintained registration state to maintain translation resources in any suitable manner. FIG. 2 illustrates a procedure 200 for translating registration messages sent from a node from within a local network to a gatekeeper within a public network in accordance with one embodiment of the present invention. As shown, endpoint node 102b sends registration request 202 to gatekeeper 108 through NAT device 104. The registration request includes a source address 204 having a value of 10.1.1.3, a destination address 206 having a value of 172.1.1.1, a source port 208 having a value of "z", and a destination port 210 having a value of 1719. The registration requests 202 also includes a payload in the form of a call signaling address 212 having a value of 10.1.1.3, a call signaling port 214 having a value of 1720, and a "time-to-live" (TTL) amount 215 having a value of one hour. The TTL amount indicates how long the registration state should last.

The NAT device 104 receives the registration request 202 and performs a translation in operation 216 which results in a translated registration request 218 that is sent to gatekeeper 108. In this example, the local source address 10.1.1.3 is translated into a global address 192.1.1.1 (220), and the local source port "z" is translated into a global source port "i" (222). The call signaling port 1720 is translated into a second global call signaling port "j" (225). In effect, the NAT device 104 reaches into the registration request's payload to translate local information located therein into global information. Accordingly, the gatekeeper 108 receives a translated registration request having only global addresses and ports.

The gatekeeper 108 will then create a registration entry for the call signaling information 224, 225, and 215. This entry may be timed out when the TTL value expires or an unregister command is received from endpoint 102d. The endpoint node 102d may keep its registration active by sending "keep alive" messages to the gatekeeper that cause the TTL timer to be reset.

Similar mechanisms are provided within the NAT device to track the endpoint node's 102d current registration state in relation to its translation operations for such endpoint node 102d. In other words, translation resources created for a particular endpoint are only kept while the particular endpoint's registration is active and discarded when the particular endpoint's registration expires. In addition to performing a translation operation 216, the NAT device 104 also creates a binding entry within a NAT table in operation 226. In the current example, entry 228 is formed within the NAT table. The entry 228 includes an inside global (IG) value that is matched with an inside local (IL) value and an outside global (OG) value that is matched with an outside local (OL) value. Each of the fields of entry 228 (e.g., IG or IL) include an address and a port value separated by a colon. As shown, the inside global value is 192.1.1.1:i; the inside local value is 10.1.1.1.3:z; the outside global value is 172.1.1.1:1719; and the outside local value is 172.1.1.1:1719. This entry 228 may later be used to translate messages sent to and from the corresponding endpoint 102d and gatekeeper 108, e.g., during an unregistration command or a request for call signaling information, which procedures are further described below with reference to FIGS. 5 through 7.

A NAT device 104 also creates a "door" entry within a registration table in operation 230. In this example, door entry 232 is created. The door entry 232 is associated with the previously created NAT table entry 228. This association may be formed in any suitable manner. As shown, a link is formed between entry 228 and door entry 232. The door entry 232 may also include a link back to the NAT table entry 228 (not shown). The door entry 232 includes call signaling information from the pre- and post-translation registration requests 202 and 218. As shown, the door entry 232 includes an inside global value of 192.1.1.1:j, an inside local value of 10.1.1.3: 1720, and a TTL value of one hour. In the illustrated embodiment, the door entry's TTL value corresponds to the TTL value specified in the registration message's payload. However, other TTL values may be used. This door entry 232 represents the registration state of endpoint node 102d. As illustrated further below, the door entry may be dismantled when the endpoint 102d registration state times out or goes to an unregistered state. The door entry 232 is also later used as a binding entry to facilitate translation of an initial communication message sent to or from the corresponding registered endpoint, which process is described further below with respect to FIGS. 5 and 6.

Figure 3:
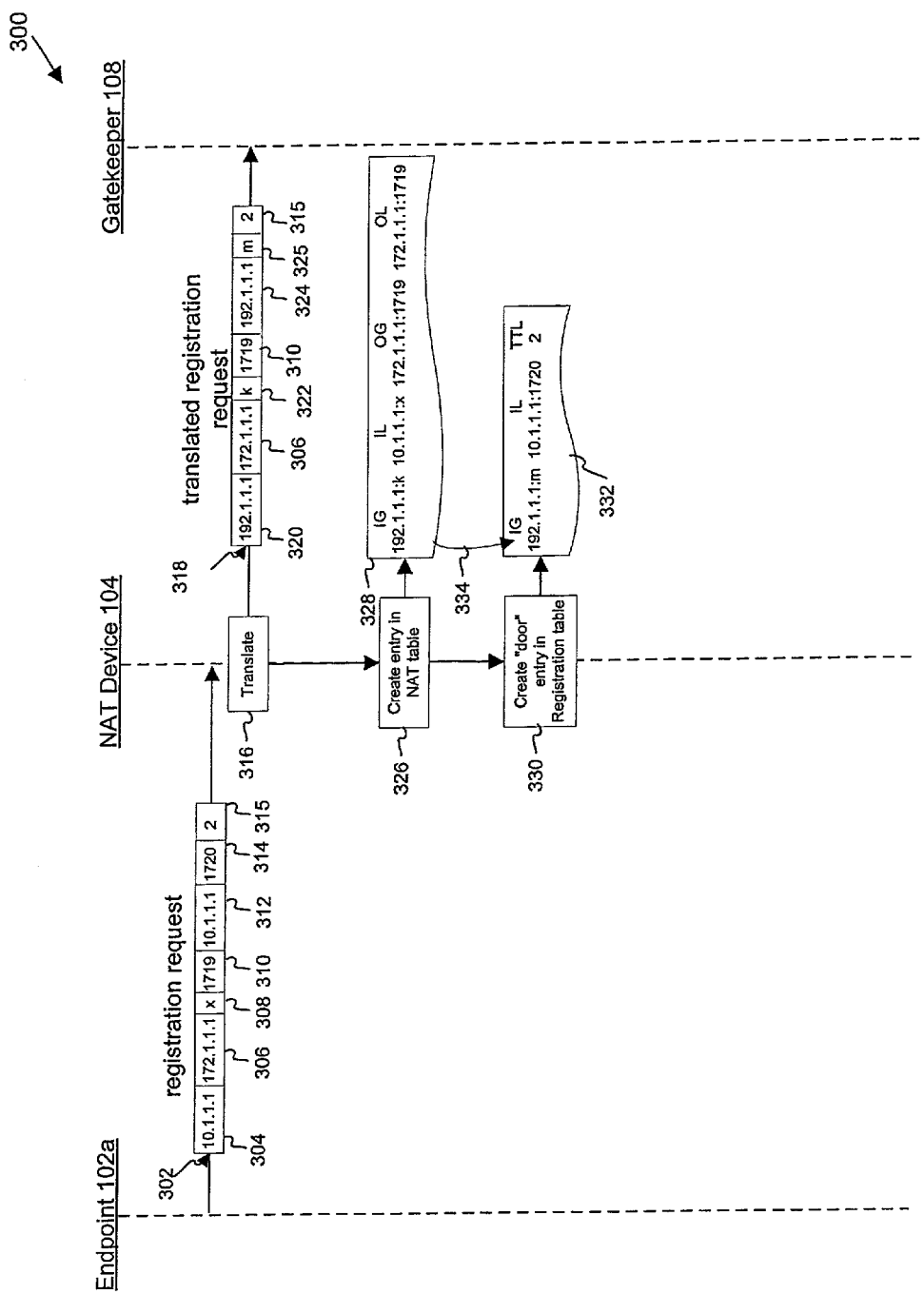
FIG. 3 illustrates a second example of mechanisms for translating registration messages sent from a second node from within a local network to a gatekeeper within a public network in accordance with one embodiment of the present invention.

FIG. 3 illustrates a second example procedure for translating registration messages sent from a second node from within a local network to a gatekeeper within a public network in accordance with one embodiment of the present invention. As shown, endpoint 102a sends registration request 302 to gatekeeper 108 through NAT device 104. The registration requests includes local source address 304 having value 10.1.1.1, a local source port 308 having value "x", a call signaling address 312 having value 10.1.1.1, and a call signaling port 314 having value 1720. These local fields are translated by NAT device 104 in operation 316. NAT device 104 then sends a translated registration request 318 to gatekeeper 108. As shown, the translated registration request contains a global source address 320 having value 192.1.1.1, a global source port 322 having value "k", a global call signaling address 324 having value 192.1.1.1, and a global call signaling port 325 having value "m."

The NAT device 104 also creates a binding entry 328 within the NAT table in operation 326. As shown, binding entry 328 includes an inside global value of 192.1.1.1:k, an inside local value of 10.1.1.1:x, an outside global value of 172.1.1.1:1719, and an outside local value of 172.1.1.1:1719. The NAT device 104 also creates a new door entry for endpoint device 102a in the registration table in operation 330. As shown, the newly created door entry 332 includes an inside global value of 192.1.1.1:m, an inside local value of 10.1.1.1: 1720, and a TTL value of 2 hours. In this illustrated embodiment, a link 334 is formed between the NAT table entry 328 and door entry 332.

Figure 4:
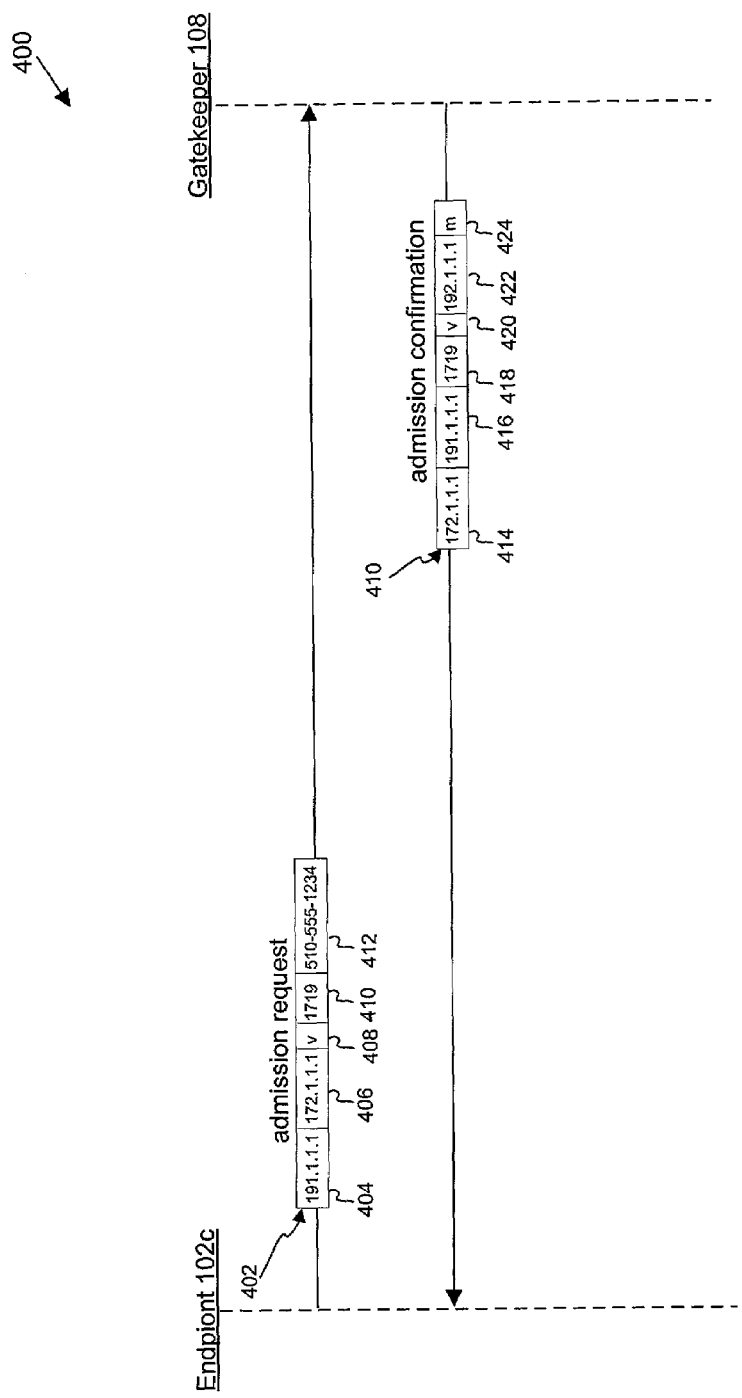
FIG. 4 is a communication diagram illustrating a procedure for a first registered endpoint to request call signaling information relating to a particular registered endpoint to thereby establish a communication connection with such registered endpoint in accordance with one embodiment of the present invention.

FIG. 4 is a communication diagram illustrating a procedure 400 for a first registered endpoint to request call signaling information relating to a particular registered endpoint in accordance with one embodiment of the present invention. The call signaling information can then be used to establish a data connection between the first registered endpoint and the particular registered endpoint. In the illustrated embodiment, endpoint 102c requests call signaling information for endpoint 102a. To accomplish this, endpoint device 102c sends an admission request 402 to gatekeeper 108. The admission request includes a global source address 404 having value 191.1.1.1, a global destination address 406 having value 172.1.1.1, a global source port 408 having value "v", a global destination port 410 having value 1719, and an identifier for endpoint 102a in the form of a telephone number (412) having value 510-555-1234.

In response to the admission request, the gatekeeper 108 sends an admission confirmation 410 back to endpoint 102c. The admission confirmation includes call-signaling information for endpoint 102a. The call signaling information forms part of the payload of admission confirmation message 410 and includes the global call signaling address 422 having value 192.1.1.1 and the global call signaling port 424 having value "m" for endpoint 102a.

Figure 5:
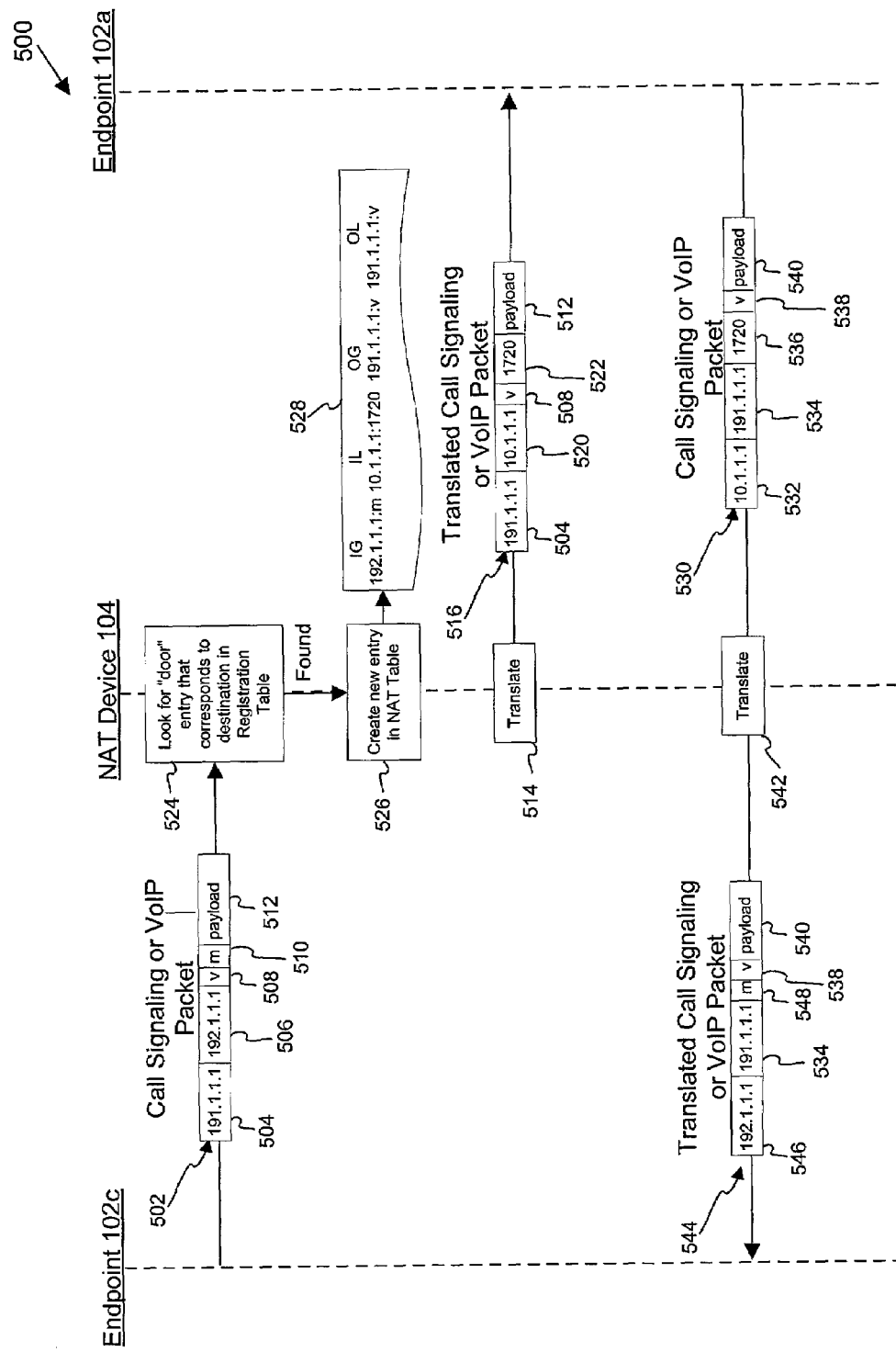
FIG. 5 is a communication diagram illustrating a procedure for translating communication data between two registered endpoints in accordance with one embodiment of the present invention.

FIG. 5 is a communication diagram illustrating a procedure 500 for translating communication data between two registered endpoints after call signaling information has been retrieved for one of the endpoints in accordance with one embodiment of the present invention. As shown, endpoint 102c sends an initial call signaling packet, such as a voice over IP (VoIP) packet, to endpoint 102a through NAT device 104. The call signaling or VoIP packet 502 includes a source address 504 having value 191.1.1.1, a destination address 506 having a value 192.1.1.1, a source port 508 having value "v", a destination port 510 having value "m", and payload 512. The endpoint 102c has previously retrieved the destination address 192.1.1.1 and destination port "m" in the form of call signaling information from the gatekeeper 108 (See FIG. 4).

When this initial call signaling or VoIP packet 502 is received into NAT device 104, the NAT device 104 looks for a door entry that corresponds to the destination address within the call signaling or VoIP packet 502 in operation 524. If the door entry is found a new binding entry is then created within the NAT table based on the door entry 528 and the call signaling or VoIP packet 502 in operation 526. This new binding indicates corresponding global and local translation addresses for both endpoints 102c and 102a. The door entry contains a local and global address and port for endpoint 102a, while the VoIP 502 contains a source address 504 and port 508 which are used for both the OG and OL for endpoint 102c within the new binding entry 516. The OG and OL have the same values since endpoint 102c is located within a public network 106. As shown, the new NAT entry 528 includes an inside global value of 192.1.1.1:m, an inside local value of 10.1.1.1:1720, an outside global value of 191.1.1.1:v, and an outside local value of 191.1.1.1:v.

This new binding entry 528 may now be used to translate communication packets between 102c and 102a. Accordingly, the NAT device translates the call signaling or VoIP packet based on the binding entry 528 in operation 514 to produce a translated call signaling or VoIP packet 516. In the illustrated embodiment, the inside global address 192.1.1.1 is translated into the inside local address 10.1.1.1, and the inside global port m is translated into the inside local port 1720. Since the endpoint 102c's addresses and ports are global, there is no translation for the address and port for endpoint 102c. In sum, the translated call signaling or VoIP packet 544 includes global source address 546 having value 192.1.1.1, local destination address having value 10.1.1.1, global source port 548 having value "v", and local destination port having value 1720. The translated call signaling or VoIP packet is sent to endpoint 102a. Alternatively, the door entry may be used to translate the call signaling or VoIP packet prior to formation of the binding 528.

In response to the first call signaling or VoIP packet 502, endpoint 102a then sends over another call signaling or VoIP packet 530 to endpoint 102c through NAT device 104. The call signaling or VoIP packet 530 includes a local source address 532 having a value 10.1.1.1 and a local port 536 having a value of 1720 for endpoint device 102a. Upon receipt of this call signaling or VoIP packet 530, the NAT device 104 translates the packet based on binding entry 528 in operation 542. That is, local source address 532 having value 10.1.1.1. is translated into global source address 192.1.1.1, and local source port 1720 is translated into global source port "m." The translated call signaling or VoIP packet 544 is then sent to endpoint 102c. The binding entry 528 may then continue to be used for subsequent translation of communication between 102c and 102a until the communication is terminated (not shown). For example, a connection termination message is sent by one of the endpoints.

Figure 6:
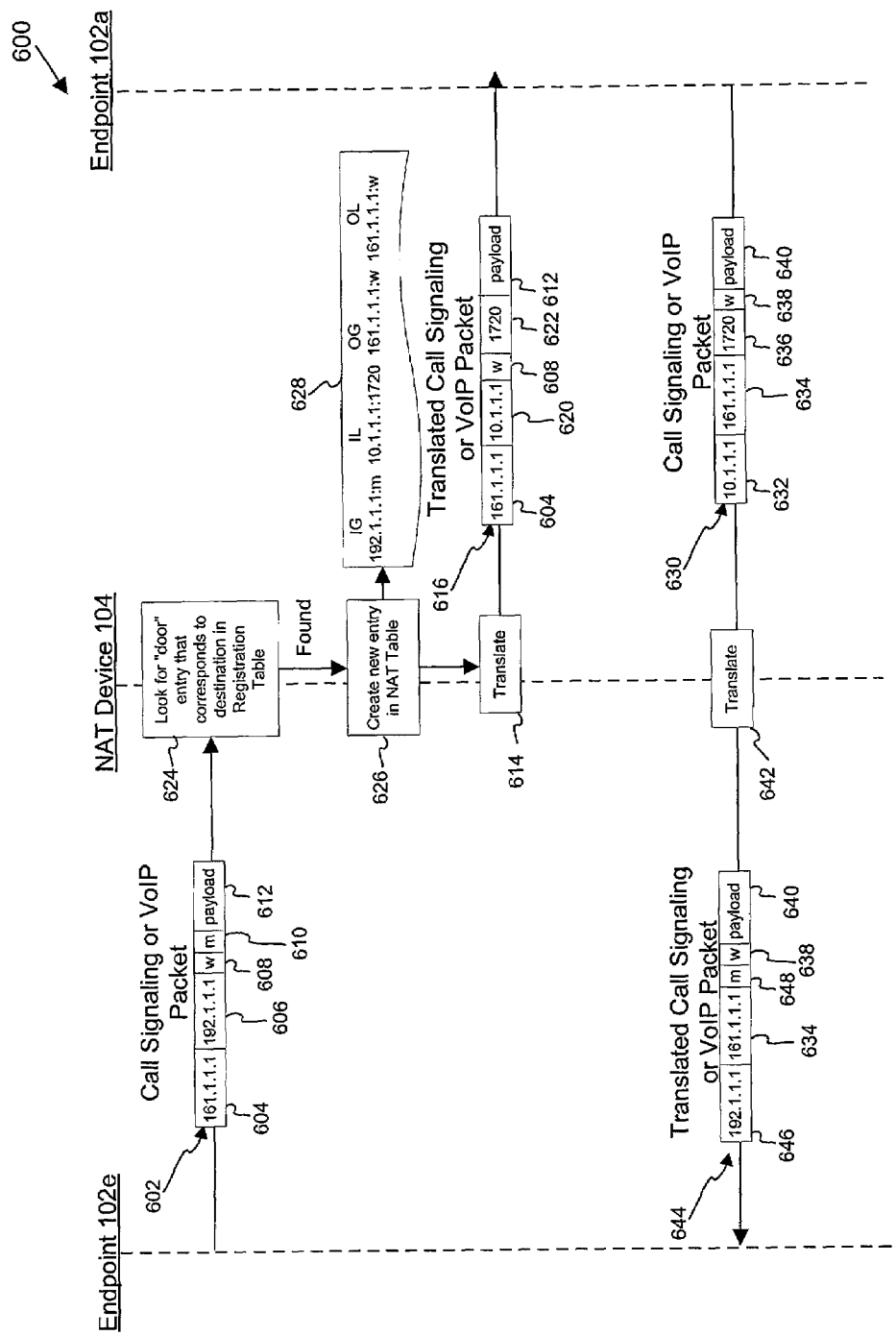
FIG. 6 illustrates a second example procedure for translating communication data between two registered endpoints in accordance with one embodiment of the present invention.

FIG. 6 illustrates a second example 600 of a procedure for translating communication data sent between endpoint 102e and endpoint 102a in accordance with one embodiment of the present invention. It is assumed that endpoint 102e has previously obtained endpoint 102a's call signaling information. That is, endpoint 102e knows the global address 192.1.1.1.1 and global port m of endpoint 102a. Referring to FIG. 6, endpoint 102e sends an initial call signaling or VoIP packet 602 to endpoint 102a through NAT device 104. The NAT device 104 looks for a door entry that corresponds to the destination 192.1.1.1 in operation 624. When a corresponding door entry is found, a new binding entry is then created in the NAT table based on the door entry and call signaling or VoIP packet 602 in operation 626. This new entry 628 includes an inside global value of 192.1.1.1:m, an inside local value of 10.1.1.1:1720, an outside global value of 161.1.1.1:w, and an outside local value of 161.1.1.1:w. Accordingly, communication data subsequently sent between endpoint 102e and 102a may then be translated using entry 628.

The initial call signaling or VoIP packet 602 is then translated by NAT device 104 based on binding entry 628 before being forwarded to endpoint 102a. That is, the global destination address 606 having a value of 192.1.1.1 is translated into a local address 620 having a value of 10.1.1.1. Likewise the global port 610 having value "m" is translated to a local port 636 having value 1720. The translated call signaling or VoIP packet 616 is then sent to endpoint 102a. As shown, the NAT device also translates a call signaling or VoIP packet 630 sent from endpoint 102a to endpoint 102c into a call signaling or VoIP packet 644 in operation 642. This translation is also based on binding entry 628.

Figure 7:
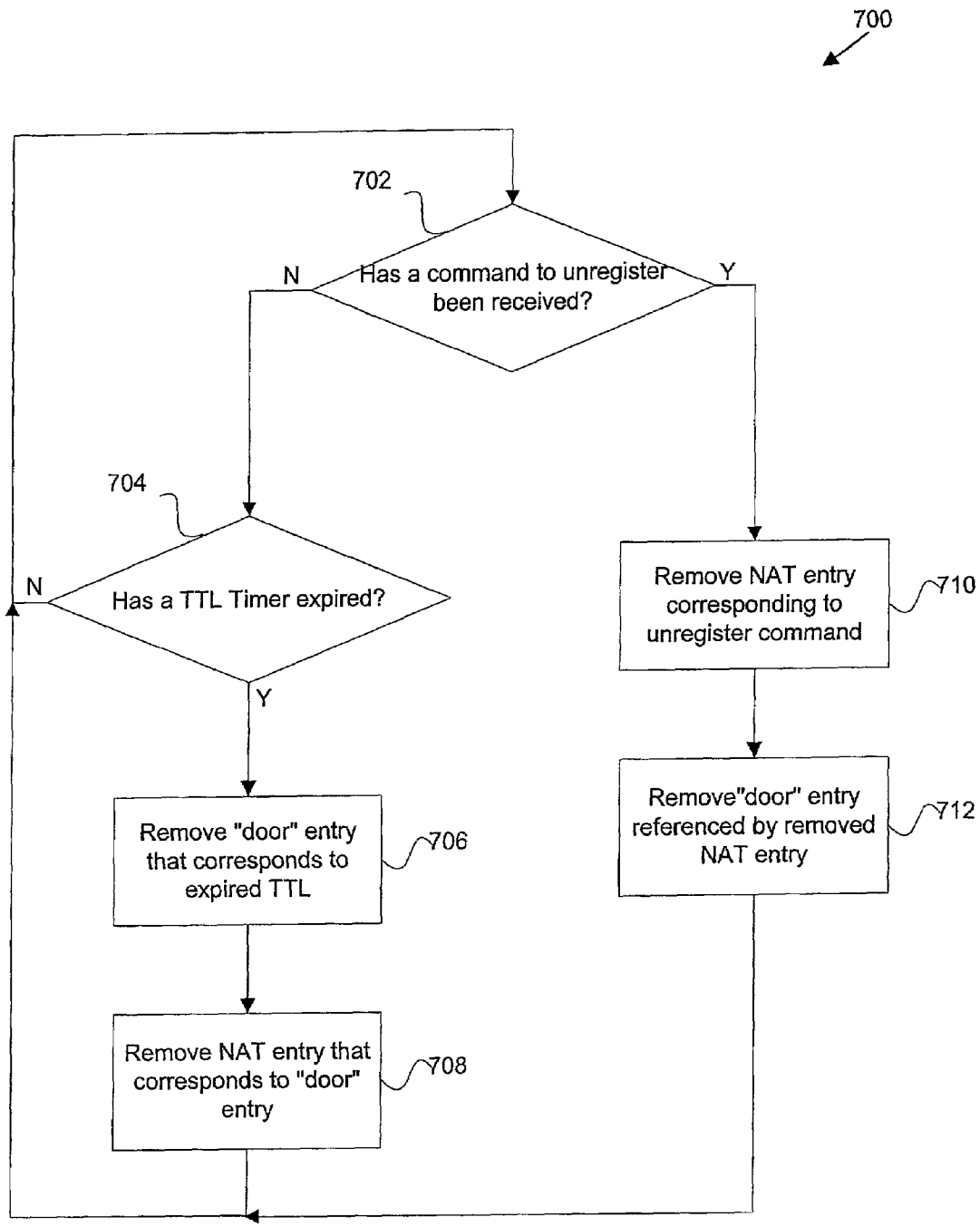
FIG. 7 is a flowchart illustrating a procedure for maintaining the registration state of a registered endpoint in a network address/port translation environment in accordance with one embodiment of the present invention.

FIG. 7 is a flowchart illustrating a procedure for maintaining the registration state of a registered endpoint in a network address/port translation environment in accordance with one embodiment of the present invention. In general terms, the registration state is associated with a binding between the registered endpoint and the gatekeeper. In a specific implementation, it is first determined whether a command to unregister has been received in operation 702. For example, a registered endpoint sends an unregister command to the gatekeeper 108 through the NAT device 104. If an unregister command has been received, the binding entry associated with the unregistering endpoint is removed in operation 710. Additionally, the door entry referenced by the removed binding entry is also removed in operation 712. Turning to FIG. 2, if the unregister command is sent by endpoint 102d, binding 228 and door entry 232 are removed. In effect, removal of the door entry and binding entry provides a mechanism to indicate unregistration of the corresponding endpoint.

If a command to unregister has not been received, it is then determined whether a TTL timer has expired in operation 704. For example, each door entry has an associated timer corresponding to its TTL value. If a TTL timer has not expired, the procedure 700 repeats. However, if a TTL timer has expired, the door entry that corresponds to the expired TTL timer is removed in operation 706. The NAT entry that corresponds to the door entry is also removed in operation 708. In sum, a binding is not maintained for unregistered or timed out endpoints so that scarce resources such as global addresses and ports may be used for other endpoints.

Generally, the techniques for performing network address translation may be implemented on software and/or hardware. For example, they can be implemented in an operating system kernel, in a separate user process, in a library package bound into network applications, on a specially constructed machine, or on a network interface card. In a specific embodiment of this invention, the techniques of the present invention are implemented in software such as an operating system or in an application running on an operating system.

A software or software/hardware hybrid packet processing system of this invention is preferably implemented on a general-purpose programmable machine selectively activated or reconfigured by a computer program stored in memory. Such programmable machine may be a network device designed to handle network traffic. Such network devices typically have multiple network interfaces including frame relay and ISDN interfaces, for example. Specific examples of such network devices include routers and switches. For example, the packet processing systems of this invention may be specially configured routers such as specially configured router models 1600, 2500, 2600, 3600, 4500, 4700, 7200, 7500, and 12000 available from Cisco Systems, Inc. of San Jose, Calif. A general architecture for some of these machines will appear from the description given below. In an alternative embodiment, the techniques of the present invention may be implemented on a general-purpose network host machine such as a personal computer or workstation. Further, the invention may be at least partially implemented on a card (e.g., an interface card) for a network device or a general-purpose computing device.

Figure 8:
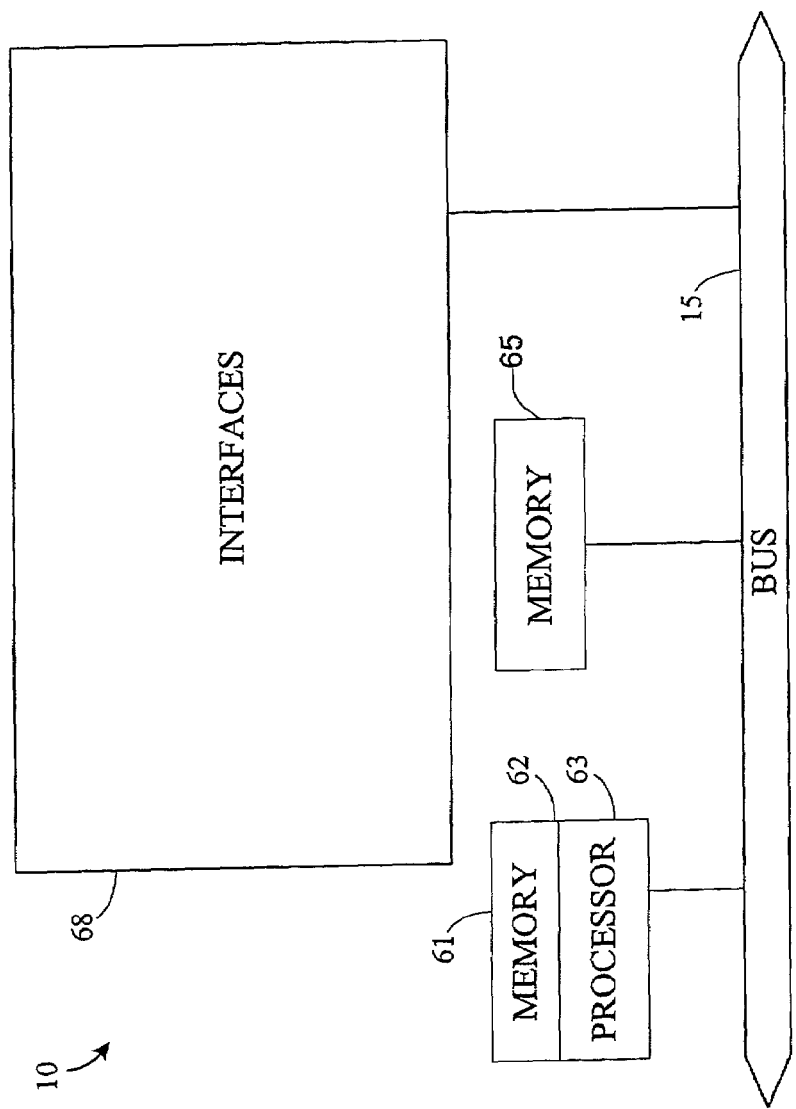
FIG. 8 is a diagrammatic representation of a router in which embodiments of the present invention may be implemented.

Referring now to FIG. 8, a router 10 suitable for implementing embodiments of the present invention includes a master central processing unit (CPU) 62, interfaces 68, and a bus 15 (e.g., a PCI bus). When acting under the control of appropriate software or firmware, the CPU 62 is responsible for such router tasks as routing table computations and network management. It may also be responsible for maintaining registration states, creating NAT bindings and corresponding door entries for registered endpoint nodes, performing NAT operations, etc. It preferably accomplishes all these functions under the control of software including an operating system (e.g., the Internetwork Operating System (IOS®) of Cisco Systems, Inc.) and any appropriate applications software. CPU 62 may include one or more processors 63 such as a processor from the Motorola family of microprocessors or the MIPS family of microprocessors. In an alternative embodiment, processor 63 is specially designed hardware for controlling the operations of router 10. In a specific embodiment, a memory 61 (such as non-volatile RAM and/or ROM) also forms part of CPU 62. However, there are many different ways in which memory could be coupled to the system. Memory block 61 may be used for a variety of purposes such as, for example, caching and/or storing data, programming instructions, etc.

The interfaces 68 are typically provided as interface cards (sometimes referred to as "line cards"). Generally, they control the sending and receiving of data packets or data segments over the network and sometimes support other peripherals used with the router 10. Among the interfaces that may be provided are Ethernet interfaces, frame relay interfaces, cable interfaces, DSL interfaces, token ring interfaces, and the like. In addition, various very high-speed interfaces may be provided such as fast Ethernet interfaces, Gigabit Ethernet interfaces, ATM interfaces, HSSI interfaces, POS interfaces, FDDI interfaces and the like. Generally, these interfaces may include ports appropriate for communication with the appropriate media. In some cases, they may also include an independent processor and, in some instances, volatile RAM. The independent processors may control such communications intensive tasks as packet switching, media control and management. By providing separate processors for the communications intensive tasks, these interfaces allow the master microprocessor 62 to efficiently perform routing computations, network diagnostics, security functions, etc.

Although the system shown in FIG. 8 is one specific router of the present invention, it is by no means the only router architecture on which the present invention can be implemented. For example, an architecture having a single processor that handles communications as well as routing computations, etc. is often used. Further, other types of interfaces and media could also be used with the router.

Regardless of network device's configuration, it may employ one or more memories or memory modules (such as, for example, memory block 65) configured to store data, program instructions for the general-purpose network operations and/or the inventive techniques described herein. The program instructions may control the operation of an operating system and/or one or more applications, for example. The memory or memories may also be configured to store received packets, identifiers to track each flow and the number of such flows, one or more Translation Tables, one or more Registration Tables, etc.

Because such information and program instructions may be employed to implement the systems/methods described herein, the present invention relates to machine readable media that include program instructions, state information, etc. for performing various operations described herein. Examples of machine-readable media include, but are not limited to, magnetic media such as hard disks, floppy disks, and magnetic tape; optical media such as CD-ROM disks and DVDs; magneto-optical media such as floptical disks; and hardware devices that are specially configured to store and perform program instructions, such as read-only memory devices (ROM) and random access memory (RAM). The invention may also be embodied in a carrier wave travelling over an appropriate medium such as airwaves, optical lines, electric lines, etc. Examples of program instructions include both machine code, such as produced by a compiler, and files containing higher level code that may be executed by the computer using an interpreter.

Although the foregoing invention has been described in some detail for purposes of clarity of understanding, it will be apparent that certain changes and modifications may be practiced within the scope of the appended claims. Therefore, the described embodiments should be taken as illustrative and not restrictive, and the invention should not be limited to the details given herein but should be defined by the following claims and their full scope of equivalents.

What is claimed is:

1. A method for managing a registration state of an endpoint node in a network address port translation environment, the method comprising:
   at a network address translation device, receiving a registration message from a first endpoint node located within a local network, the registration message being sent from the first endpoint node to a gatekeeper node, wherein the registration message includes a local source address of the first endpoint node, a first local source port of the first endpoint node, and local call signaling information;
   at the network address translation device, translating the local source address and/or the first local source port of the first endpoint node into a first global address and/or a first global port, respectively;
   at the network address translation device, creating a first binding that associates the local source address with the global source address and/or associates the first local source port with the first global port;
   at the network address translation device, translating the local call signaling information into global call signaling information;
   at the network address translation device, creating a second binding between the local call signaling information and the global call signaling information such that the second binding associates different local and global information than the first binding, wherein creating the first and second bindings is based on the registration message that was received at the network translation device; and
   if an unregistration message is received from the first endpoint node, dismantling the first binding and the second binding at the network address translation device.

2. A method as recited in claim 1, wherein the second binding associates a second local source port of the local call signaling information with a second global port and wherein the second local source port differs from the first local port and the second global port differs from the first global port and wherein the local source address and first local source port are translated into the first global address and the first global port, respectively, and wherein the first global address and port and the second global source port can be used by another endpoint node to communicate with the first endpoint node.

3. A method as recited in claim 2, wherein the local call signaling information is within the payload of the registration message and further includes the local source address.

4. A method as recited in claim 1, further comprising:
   setting a timer based on a time period associated with the registration message;
   restarting the timer when a refresh message is received from the first endpoint node; and
   dismantling the first and second binding if the timer expires.

5. A method as recited in claim 4, wherein creating the second binding includes creating a registration door containing the global call signaling information and the time period after which the registration of the first endpoint node is to expire, the time period originating from within the local call signaling information, and dismantling the second binding is further accomplished by dismantling the registration door if the timer expires or if an unregistration message is received from the first endpoint node.

6. A method as recited in claim 5, wherein the first binding is an entry within a NAT Table and the registration door is an entry within a Registration Table.

7. A method as recited in claim 1, further comprising:
creating a registration door containing the global call signaling information and a time period after which the registration of the first endpoint node is to expire, the time period originating from within the local call signaling information; and
associating the registration door with the first binding.

8. A method as recited in claim 7, wherein associating the registration door with the first binding is accomplished by forming a link there between the registration door and the first binding.

9. A method as recited in claim 7, further comprising:
receiving a communication message from a second endpoint node destined for the first endpoint node, the communication message being a first message to establish a data connection between the second and first endpoint, the communication message having a second source address, a second destination address, a second source port, and a second destination port, wherein the second destination address equals the first global address and the second destination port equals a first global port obtained from the global call signaling information;
translating the communication message based on the registration door; and
wherein creation of the second binding is based on the registration door, the second binding being useful for translating subsequent communication messages sent between the first and second endpoints.

10. A method as recited in claim 9, further comprising dismantling the registration door and its associated first binding if a timer associated with the registration message expires or if an unregistration message is received from the first endpoint node.

11. A network address translation (NAT) system operable to manage a registration state of an endpoint node in a network address port translation environment, the NAT system comprising:
one or more processors;
one or more memory, wherein at least one of the processors and memory are adapted to:
receive a registration message from a first endpoint node located within a local network, the registration message being sent from the first endpoint node to a gatekeeper node, wherein the registration message includes a local source address of the first endpoint node, a first local source port of the first endpoint node, and local call signaling information;
translate the local source address and/or the first local source port of the first endpoint node into a first global address and/or a first global port, respectively;
create a first binding that associates the local source address with the global source address and/or associates the first local source port with the first global port;
translate the local call signaling information into global call signaling information;
create a second binding between the local call signaling information and the global call signaling information such that the second binding associates different local and global information than the first binding, wherein creating the first and second bindings is based on the registration message that was received at the network translation device; and
if an unregistration message is received from the first endpoint node, dismantle the first binding and the second binding.

12. A NAT system as recited in claim 11, wherein the second binding associates a second local source port of the local call signaling information with a second global port and wherein the second local source port differs from the first local port and the second global port differs from the first global port and wherein the local source address and first local source port are translated into the first global address and the first global port, respectively, and wherein the first global address and port and the second global source port can be used by another endpoint node to communicate with the first endpoint node.

13. A NAT system as recited in claim 12, wherein the local call signaling information is within the payload of the registration message and further includes the local source address.

14. A NAT system as recited in claim 11, wherein at least one of the processors and memory are further adapted to:
set a timer based on a time period associated with the registration message;
restart the timer when a refresh message is received from the first endpoint node and
dismantle the first and second binding if the timer expires.

15. A NAT system as recited in claim 14, wherein creating the second binding includes creating a registration door containing the global call signaling information and the time period after which the registration of the first endpoint node is to expire, the time period originating from within the local call signaling information, and dismantling the second binding is further accomplished by dismantling the registration door if the timer expires or if an unregistration message is received from the first endpoint node.

16. A NAT system as recited in claim 15, wherein the first binding is an entry within a NAT Table and the registration door is an entry within a Registration Table.

17. A NAT system as recited in claim 11, wherein at least one of the processors and memory are further adapted to:
creating a registration door containing the global call signaling information and a time period after which the registration of the first endpoint node is to expire, the time period originating from within the local call signaling information; and
associating the registration door with the first binding.

18. A NAT system as recited in claim 17, wherein associating the registration door with the first binding is accomplished by forming a link there between the registration door and the first binding.

19. A NAT system as recited in claim 17, wherein at least one of the processors and memory are further adapted to:
receive a communication message from a second endpoint node destined for the first endpoint node, the communication message being a first message to establish a data connection between the second and first endpoint, the communication message having a second source address, a second destination address, a second source port, and a second destination port, wherein the second destination address equals the first global address and the second destination port equals a first global port obtained from the global call signaling information;
translate the communication message based on the registration door; and
wherein creation of the second binding is based on the registration door, the second binding being useful for translating subsequent communication messages sent between the first and second endpoints.

20. A NAT system as recited in claim 19, wherein at least one of the processors and memory are further adapted to dismantle the registration door and its associated first binding if a timer associated with the registration message expires or if an unregistration message is received from the first endpoint node.

21. A computer program product for managing a registration state of an endpoint node in a network address port translation environment, the computer program product comprising:
   at least one computer readable storage medium;
   computer program instructions stored within the at least one computer readable storage medium product configured to:
   at a network address translation device, receive a registration message from a first endpoint node located within a local network, the registration message being sent from the first endpoint node to a gatekeeper node, wherein the registration message includes a local source address of the first endpoint node, a first local source port of the first endpoint node, and local call signaling information;
      at the network address translation device, translate the local source address and/or the first local source port of the first endpoint node into a first global address and/or a first global port, respectively;
      at the network address translation device, create a first binding that associates the local source address with the global source address and/or associates the first local source port with the first global port;
      at the network address translation device, translate the local call signaling information into global call signaling information;
      at the network address translation device, create a second binding between the local call signaling information and the global call signaling information such that the second binding associates different local and global information than the first binding, wherein creating the first and second bindings is based on the registration message that was received at the network translation device; and
      if an unregistration message is received from the first endpoint node, dismantle the first binding and the second binding at the network address translation device.

22. A computer program product as recited in claim 21, wherein the second binding associates a second local source port of the local call signaling information with a second global port and wherein the second local source port differs from the first local port and the second global port differs from the first global port and wherein the local source address and first local source port are translated into the first global address and the first global port, respectively, and wherein the first global address and port and the second global source port can be used by another endpoint node to communicate with the first endpoint node.

23. A computer program product as recited in claim 22, wherein the local call signaling information is within the payload of the registration message and further includes the local source address.

24. A computer program product as recited in claim 21, wherein the computer program instructions are further configured to:
   setting a timer based on a time period associated with the registration message;
   restarting the timer when a refresh message is received from the first endpoint node, and
   dismantle the first and second binding if the timer expires.

25. A computer program product as recited in claim 24, wherein creating the second binding includes creating a registration door containing the global call signaling information and the time period after which the registration of the first endpoint node is to expire, the time period originating from within the local call signaling information, and dismantling the second binding is further accomplished by dismantling the registration door if the timer expires or if an unregistration message is received from the first endpoint node.

26. A computer program product as recited in claim 25, wherein the first binding is an entry within a NAT Table and the registration door is an entry within a Registration Table.

27. A computer program product as recited in claim 21, wherein the computer program instructions are further configured to:
   creating a registration door containing the global call signaling information and a time period after which the registration of the first endpoint node is to expire, the time period originating from within the local call signaling information; and
   associating the registration door with the first binding.

28. A computer program product as recited in claim 27, wherein associating the registration door with the first binding is accomplished by forming a link there between the registration door and the first binding.

29. A computer program product as recited in claim 27, wherein the computer program instructions are further configured to
   receive a communication message from a second endpoint node destined for the first endpoint node, the communication message being a first message to establish a data connection between the second and first endpoint, the communication message having a second source address, a second destination address, a second source port, and a second destination port, wherein the second destination address equals the first global address and the second destination port equals a first global port obtained from the global call signaling information;
   translate the communication message based on the registration door; and
   wherein creation of the second binding is based on the registration door, the second binding being useful for translating subsequent communication messages sent between the first and second endpoints.

30. A computer program product as recited in claim 29, wherein the computer program instructions are further configured to dismantle the registration door and its associated first binding if a timer associated with the registration message expires or if an unregistration message is received from the first endpoint node.

31. An apparatus for managing a registration state of an endpoint node in a network address port translation environment, the apparatus comprising:
   means for receiving a registration message from a first endpoint node located within a local network, the registration message being sent from the first endpoint node to a gatekeeper node, wherein the registration message includes a local source address of the first endpoint node, a first local source port of the first endpoint node, and local call signaling information
   means for translating the local source address and/or the first local source port of the first endpoint node into a first global address and/or a first global port, respectively;
   means for creating a first binding that associates the local source address with the global source address and/or associates the first local source port with the first global port;

means for translating the local call signaling information into global call signaling information;

means for creating a second binding between the local call signaling information and the global call signaling information such that the second binding associates different local and global information than the first binding, wherein creating the first and second bindings is based on the registration message that was received at the network translation device; and means for dismantling the first binding and the second binding if an unregistration message is received from the first endpoint node.

32. An apparatus as recited in claim 31, further comprising:

means for creating a registration door containing the global call signaling information and a time period after which the registration of the first endpoint node is to expire, the time period originating from within the local call signaling information; and means for associating the registration door with the first binding.

33. An apparatus as recited in claim 32, further comprising:

means for receiving a communication message from a second endpoint node destined for the first endpoint node, the communication message being a first message to establish a data connection between the second and first endpoint, the communication message having a second source address, a second destination address, a second source port, and a second destination port, wherein the second destination address equals the first global address and the second destination port equals a first global port obtained from the global call signaling information;

means for translating the communication message based on the registration door; and wherein creation of the second binding is based on the registration door, the second binding being useful for translating subsequent communication messages sent between the first and second endpoints.

34. An apparatus as recited in claim 33, further comprising means for dismantling the registration door and its associated first binding if a timer associated with the registration message expires or if an unregistration message is received from the first endpoint node.

35. A method as recited in claim 1, wherein the first and second bindings are dismantled so that their global information can be used by other endpoint nodes.

36. A NAT system as recited in claim 11, wherein the first and second bindings are dismantled so that their global information can be used by other endpoint nodes.

* * * * *